United States Patent Office 3,163,667
Patented Dec. 29, 1964

3,163,667
PREPARATION OF β-SULFATO-ETHANE SULFONAMIDES AND AMINE SALTS THEREOF
Donald L. Klass, Barrington, and Thomas W. Martinek, Crystal Lake, Ill., assignors to The Pure Oil Company, Chicago, Ill., a corporation of Ohio
No Drawing. Filed Nov. 9, 1960, Ser. No. 68,151
10 Claims. (Cl. 260—458)

This invention relates to a process for the preparation of β-sulfato-ethane sulfonamides and amine salts thereof.

The β-sulfato-ethane sulfonamides and their salts are known to be useful intermediates in the production of various organic compounds. For example, they may be reacted with a base and then with an acid to form ethylene sulfonamides which, in turn, are useful in the preparation of dyes, textile assistants, pesticides, etc. In Ebel, Patent No. 2,666,788, there is described a process for the preparation of ethylene sulfarylamides in which β-sulfato-ethane sulfonamides are formed as intermediates. Ebel discloses a process in which carbyl sulfate is milled for several hours with an aromatic amine, either alone or in the presence of an inert diluent. Ebel emphasizes the necessity for milling in this reaction due to the insolubility of carbyl sulfate in the liquid diluents used. Ebel also emphasizes the necessity of using at least two equivalents of amine per molecule of carbyl sulfate in order to obtain an amine salt as the product. He states that if only one equivalent of amine is used, it is necessary to replace the second equivalent with a tertiary amine.

One of the objects of this invention is to provide an improved process for the preparation of β-sulfato-ethane sulfonamides and amine salts thereof in high purity and good yield.

A feature of this invention is the provision of a process in which β-sulfato-ethane sulfonamides and amine salts are prepared by reaction of carbyl sulfate with a primary or secondary amine in an inert solvent characterized by low hydrogen-bonding ability and a solubility parameter of about 9.3 to 10.6.

Other objects and features of this invention will become apparent from time to time throughout the specification and claims as hereinafter related.

This invention consists of our new and improved method for preparing high-purity β-sulfato-ethane sulfonamides and amine salts thereof. In our process, carbyl sulfate is dissolved in an inert solvent and treated with one or two equivalents of an amine, and the precipitate which is recovered is a substantially pure β-sulfato-ethane sulfonamide or the amine salt thereof, depending upon the proportion of amine used in the reaction. Even higher purity of product can be attained by simple recrystallization of the product from aqueous solution.

In carrying out the process of this invention, an inert solvent is used in which both carbyl sulfate and the reactant amine are soluble, but in which the product is insoluble. The inert solvent is defined as one which is unreactive toward either of the reactants or the reaction product. Inert solvents which can be used in this process are characterized by low hydrogen-bonding ability and a solubility parameter in the range from about 9.3 to 10.6. The solubility parameter is a term developed by Hildebrand and discussed in detail, in Hildebrand and Scott, Solubility of Nonelectrolytes, 3rd Edition, Reinhold Publishing Corp. (1949). The use of the solubility parameter in prediction of solubility characteristics of various solvents is developed by Burrell in Solubility Parameters for Film Formers, Official Digest, 27, 727–758 (1955). Solvents which fall within the above definition with regard to solubility parameter and hydrogen-bonding ability and which are inert in the reaction include the following: chloroform, capronitrile, pentachloroethane, chlorobenzene, tetrahydronaphthalene, 1,1,2-trichloroethane, dichloroethyl ether, ethylene dichloride, o-dichlorobenzene, nitrobenzene, 1,2-dibromoethane, butyronitrile, and α-bromonaphthalene. Additionally, mixtures of solvents can be used which have low hydrogen-bonding ability and a solubility parameter in the aforementioned range, even though the individual solvents in the mixture are not solvents for the reactants in this process. For example, neither carbon tetrachloride nor methylene iodide is a solvent which can be used in this reaction, but a mixture of equal parts by volume of these solvents can be used in this process. Similarly, a mixture of dibromoethane and chloroform is superior as a solvent to either of these solvents alone when used in this process.

We have found that our process functions satisfactorily at temperatures of 0°–20° C., although temperatures in the range from −10° to +50° C. may be used. Within this temperature range, we have found that when carbyl sulfate and a primary or secondary amine are dissolved and mixed in an inert mutual solvent, the reaction goes to completion within a very few minutes to yield substantially pure β-sulfato-ethane sulfonamide, as compared to several hours required by the prior art to obtain an impure product. Recovery of β-sulfato-ethane sulfonamides, or their salts, from our reaction mixture is readily accomplished by simple filtration in view of their precipitation in substantially pure form from the reaction mixture. Even greater purity has been obtained by recrystallization from water, but it appears probable that the recrystallization step is unnecessary in most cases. In carrying out this process, we have found that amine/carbyl sulfate molar ratios within the range of 1 to 2 are satisfactory. A ratio of 1 results in a β-sulfato-ethane sulfonamide, while a ratio of about 2 results in the amine salt thereof. Ratios between 1 and 2 result in mixtures of these products. In carrying out this process, the amines apparently react with the carbyl sulfate in accordance with the equations:

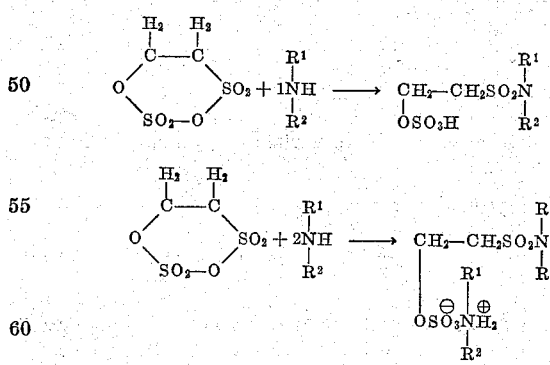

The following non-limiting examples are illustrative of the scope of this invention.

EXAMPLE I

A solution of 18.6 g. (0.0995 mole) of carbyl sulfate in 50 ml. of 1,2-dichloroethane was cooled to 0° C. in an ice bath, and 9.2 g. (0.0995 mole) of aniline were added dropwise, with stirring. The addition of aniline took about 10 minutes, during which time the temperature of the reaction mass increased to 20° C. The β-sulfato-derivative precipitated immediately as the aniline was added, but after all of the aniline had been added, 100 ml. more of 1,2-dichloroethane were added, and the mixture was stirred an additional 30 minutes at room temperature to assure completion of the reaction. Then the solid product was recovered by filtration and washed with 1,2-dichloroethane. The washed and air-dried product melted at 155°–160° C. (in vacuo) and weighed 21.0 g., representing a yield of about 75.5%. One recrystallization from water yielded a product in the form of white needles, having a melting point of 155°–160° C. (in vacuo) and a neutralization value of 293 (theoretical, 281). The similarity in melting points indicates that the product was substantially pure as recovered from the reaction, even without recrystallization. Aqueous solutions of the product were strongly acidic, indicating that the β-sulfato-acid had been obtained as predicted.

EXAMPLE II

In another experiment, the reaction described in Example I was carried out using two equivalents of aniline per mol of carbyl sulfate. In this experiment, a 95% yield of the aniline salt of β-sulfato-ethane sulfonanilide, having a melting point of 145°–164° C. (in vacuo), was obtained. Upon recrystallization from water, the product was attained in the form of white needles which had a melting point range of 150°–164° C. (in vacuo) and a neutralization equivalent of 337 (theoretical, 374). The similarity of melting points of the raw product and the recrystallized product indicates a high degree of purity of the raw product. Aniline was liberated when the product was dissolved in aqueous base, while sulfate ion was liberated when the product was boiled in acidified water, thereby confirming the structure of the product.

EXAMPLE III

In another experiment, a portion of the crude aniline salt obtained in Example II was converted to ethylene sulfonanilide. In this experiment, 2.7 g. (0.067 mol) of sodium hydroxide were added to a solution of 5.0 g. (0.0134 mol) of the crude aniline salt of β-sulfato-ethane sulfonamide in 25 ml. of water. The mixture was heated on a steam bath for one hour. Aniline separated as an upper layer and was easily detected by odor. The solution was then cooled with running water and acidified with 20% hydrochloric acid solution to a pH of 6. The solution was then cooled in an ice bath to solidify the precipitated oily layer and filtered through a large Büchner funnel. The filtration was carried out rapidly to prevent the solid product from melting. The crude product which had a melting point of 60°–65° C. (in vacuo), was recrystallized once from benzene-hexane solution to obtain pure ethanesulfonanilide as white crystals having a melting point of 67°–69° C. (in vacuo), as compared with a reported melting point of 69°–72° C.

EXAMPLE IV

When this process is carried out using other solvents and other amines, similar products are obtained. When the carbyl sulfate and amines are dissolved in an inert mutual solvent, the sulfonamide product precipitates rapidly in a very pure form. In Table I, there is set forth in tabular form the reaction and products which are obtained substituting different amine reactants and different solvents in the process described in Examples I and II.

Table 1

$$nNHR^1R^2 + \begin{matrix} CH_2-CH_2-O \\ | \quad\quad\quad | \\ SO_2-O-SO_2 \end{matrix} \xrightarrow{(1)} \begin{matrix} CH_2-CH_2-SO_2-N \\ | \quad\quad\quad\quad\quad | \\ OSO_3H \quad\quad R^2 \end{matrix}^{R^1}$$

where $n$ is 1 where $n$ is 2

$$(2) \quad \begin{matrix} CH_2-CH_2-SO_2-N \\ | \quad\quad\quad\quad\quad\quad | \\ R^1 \quad\quad\quad\quad R^2 \\ | \\ RSO_3NH_2^{\oplus} \\ | \\ R^2 \end{matrix}^{R^1}$$

| Amine | Amine/ Carbyl Sulfate Mol Ratio | Solvent | Temp., °C. | Product |
|---|---|---|---|---|
| φ₂NH | 2 | Chloroform | 20 | (2) |
| C₆H₅CH₂NH₂ | 1 | Pentachloroethane | 15 | (1) |
| CH₃NH₂ | 2 | Chlorobenzene | 10 | (2) |
| (CH₃)₂NH | 1 | 1,1,2-Trichloroethane | 20 | (1) |
| C₆H₁₃NH₂ | 2 | Dichloroethyl ether | 25 | (2) |
| C₁₈H₃₇NH₂ | 1 | o-Dichlorobenzene | 25 | (1) |
| cyC₆H₁₁NH₂ | 2 | Ethylenedibromide | 20 | (2) |
| C₁₂H₂₅C₆H₄NH₂ | 1 | α-Bromonaphthalene | 15 | (1) |
| φNHCH₃ | 2 | Butyronitrile | 15 | (2) |
| φNH₂ | 1 | Tetralin | 10 | (1) |
| φNH₂ | 1 | Nitrobenzene | 10 | (1) |
| φNH₂ | 2 | Capronitrile | 15 | (2) |
| φNH₂ | 2 | Methylene iodide +Carbon tetrachloride | 15 | (2) |
| φNH₂ | 1 | Propylene dichloride+Ethylene dibromide | 10 | (1) |
| φNH₂ | 2 | Benzonitrile+ Acetonitrile | 20 | (2) |

From the foregoing examples, it is seen that our process is generally applicable to the reaction of carbyl sulfate with any primary or secondary amine in solution in an inert mutual solvent having low hydrogen-bonding ability and a solubility parameter in the range from about 9.3 to 10.6.

The embodiments of the invention in which an exclusive property or privilege is claimed are defined as follows:

1. A method of preparing β-sulfato-ethane sulfonamides which comprises reacting carbyl sulfate with an amine selected from the group consisting of alkyl, aryl and cycloalkyl primary and secondary amines at a temperature of −10° to +50° C. in a solvent having low hydrogen-bonding power and a solubility parameter of about 9.3 to 10.5, in which the carbyl sulfate and amine are soluble and the sulfonamide product is insoluble and which is inert at reaction conditions to the carbyl sulfate, amine and sulfonamide product.

2. A method in accordance with claim 1 in which the carbyl sulfate and amine are reacted for about ten minutes.

3. A method according to claim 2 in which the solvent is selected from the group consisting of chloroform, capronitrile, pentachloroethane, chlorobenzene, tetrahydronaphthalene, 1,1,2 - trichloroethane, dichloroethyl ether, ethylene dichloride, o-dichlorobenzene, nitrobenzene, 1,2-dibromoethane, butyronitrile, α-bromonaphthalene, mixtures of methylene iodide and carbon tetrachloride, and of benzonitrile and acetonitrile.

4. A method in accordance with claim 3 in which the amine is selected from the group consisting of diphenyl amine, benzyl amine, methyl amine, dimethyl amine, hexyl amine, stearyl amine, cyclohexyl amine, dodecyl aniline, phenyl methyl amine and aniline.

5. A method in accordance with claim 2 in which carbyl sulfate is reacted with the amine in a 1:1 mol ratio to produce a precipitate of β-sulfato-ethane sulfonamide of substantially pure form.

6. A method in accordance with claim 5 in which the solvent is ethylene dichloride.

7. A method in accordance with claim 5 in which the amine is aniline.

8. A method in accordance with claim 2 in which carbyl sulfate is reacted with the amine in a ratio of 1 mol of the former to at least 2 mols of the latter to produce a precipitate of an amine salt of β-sulfato-ethane sulfonamide of substantially pure form.

9. A method in accordance with claim 8 in which the solvent is ethylene dichloride.

10. A method in accordance with claim 8 in which the amine is aniline.

References Cited in the file of this patent

UNITED STATES PATENTS 2,666,788    Ebel ------------------ Jan. 19, 1954

UNITED STATES PATENT OFFICE
CERTIFICATE OF CORRECTION

Patent No. 3,163,667                          December 29, 1964

Donald L. Klass et al.

It is hereby certified that error appears in the above numbered patent requiring correction and that the said Letters Patent should read as corrected below.

Column 4, lines 2 to 14, the lower portion of the formula should appear as shown below instead of as in the patent:

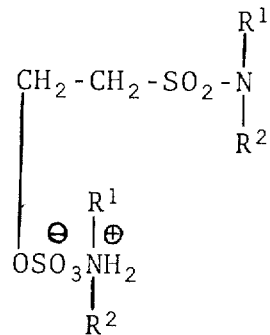

Signed and sealed this 6th day of July 1965.

(SEAL)
Attest:

ERNEST W. SWIDER                          EDWARD J. BRENNER
Attesting Officer                         Commissioner of Patents